United States Patent
Kikkawa

(10) Patent No.: US 6,508,655 B2
(45) Date of Patent: Jan. 21, 2003

(54) ROTARY CONNECTOR

(75) Inventor: Tomoyoshi Kikkawa, Shizuoka (JP)

(73) Assignee: Azaki Corporation, Tokyo (JP)

( * ) Notice: Subject to any disclaimer, the term of this patent is extended or adjusted under 35 U.S.C. 154(b) by 0 days.

(21) Appl. No.: 09/939,692

(22) Filed: Aug. 28, 2001

(65) Prior Publication Data

US 2002/0025706 A1 Feb. 28, 2002

(30) Foreign Application Priority Data

Aug. 28, 2000 (JP) ........................................ 2000-257430

(51) Int. Cl.⁷ .............................................. H01R 35/04
(52) U.S. Cl. ...................................................... 439/164
(58) Field of Search ................................. 439/164, 15

(56) References Cited

U.S. PATENT DOCUMENTS

| | | | | |
|---|---|---|---|---|
| 5,277,604 A | * | 1/1994 | Ida et al. ..................... | 439/164 |
| 5,588,854 A | | 12/1996 | Ikumi et al. | |
| 5,762,506 A | * | 6/1998 | Du-Rocher ................. | 439/164 |
| 5,871,367 A | * | 2/1999 | Ichikawa et al. ........... | 439/164 |
| 5,957,711 A | * | 9/1999 | Tanaka et al. .............. | 439/164 |
| 6,224,406 B1 | * | 5/2001 | Takahashi et al. .......... | 439/164 |

FOREIGN PATENT DOCUMENTS

| JP | 406275354 | * | 9/1994 | ................. | 439/164 |

\* cited by examiner

*Primary Examiner*—Gary Paumen
(74) *Attorney, Agent, or Firm*—Sughrue Mion, PLLC

(57) ABSTRACT

A rotary connector includes: a cylindrical fixed member defining an inner receiving portion; a rotary member rotatably concentrically mounted in the inner receiving portion defining an annular space in cooperation with the cylindrical fixed member; a spirally-wound flexible flat cable received in the annular space, wherein an outer periphery-side end of the flexible flat cable is fixed to the fixed member and a center-side end of the flexible flat cable is fixed to the rotary member; and a contact surface defining the annular space in cooperation with the cylindrical fixed member and the rotary member, wherein a portion of the contact surface adjacent to at least one of the cylindrical fixed member and the rotary member has a slanting surface slanting downwardly so that the flexible flat cable separates from a middle portion of the contact surface.

2 Claims, 4 Drawing Sheets

ROTARY CONNECTOR

BACKGROUND OF THE INVENTION

1. Technical Field of the Invention

This invention relates to a rotary connector for making electrical connection between a rotary member and a fixed member, for example, in a steering device of an automobile in which the number of revolutions of the rotary member is finite.

2. Related Art

In a rotary connector 1 of the type described, a cylindrical rotator (rotary member) 5 is rotatably mounted in an inner receiving portion 3a of a cylindrical undercover (fixed member) 3 in concentric relation thereto, as shown in FIG. 4. A flexible flat cable 7 is received in a spirally-wound manner between the inner receiving portion 3a and the rotator 5. A carrier 11 is provided between the rotator 5 and the flexible flat cable 7, and has a plurality of idlers 9 for absorbing slack of the flexible flat cable 7 so as to smoothly effect the winding-up and feeding of the flexible flat cable 7.

A cylindrical cover (fixed member) 13 is fitted on the undercover 3. The cover 13 has a concentric hole 13a, and an upper portion of the rotator 5 projects from the cover 13 through the hole 13a. An annular upper cover (rotary member) 15 is provided on an upper surface of the cover 13, and this upper cover 15 is fixed to the rotator 5 so as to rotate therewith. A vehicle body-side connector 17 is mounted at an outer periphery-side end of the flexible flat cable 7, and this vehicle body-side connector 17 is fixed to the undercover 3. Steering-side connectors 19 are mounted at a center-side end of the flexible flat cable 7, and the steering-side connectors 19 are passed through the hole 13a in the cover 13, and are fixed to the upper cover 15.

In the rotary connector 1 of this construction, the undercover 3 is fixed to a steering column, and the rotator 5 is fixed to a steering shaft through the upper cover 15 which is rotated by engaging an engagement boss 16 with an engagement hole in the steering (not shown). With this construction, slack of the flexible flat cable 7f due to the rotation of a handle is absorbed by the winding-up and feeding of the flexible flat cable 7, and thereby enabling auxiliary equipments (the rotary side) (such as a horn switch, a steering switch, control switches of an audio and so on, and an inflator) to be electrically connected to a wire harness (the fixed side) installed on a vehicle body.

However, in the above related rotary connector, when the undercover 3 and the rotator 5 are rotated relative to each other, a turned portion 7a of the flexible flat cable 7, shown in FIG. 7, moves in the annular space formed by the inner receiving portion 3a in a circumferential direction (direction of arrow B). At this time, as shown in FIG. 6, a lower edge 7b of the flexible flat cable 7, disposed parallel to a plane perpendicular to the center axis of the volute of the flexible flat cable 7, slides on an annular bottom surface 3b of the inner receiving portion 3a, and also this lower edge 7b of the flexible flat cable 7 slides on a flange surface 5a formed on the outer periphery of the rotator 5. An effect at the annular bottom surface 3b of the inner receiving portion 3a will be explained for example. As shown in FIG. 7, the annular bottom surface 3b of the related construction is disposed parallel to a plane perpendicular to the center axis of the volute of the flexible flat cable 7, and therefore the flat cable 7 slides on the annular bottom surface 3b over the entire range of this annular bottom surface 3b, as shown in FIG. 8. As a result a harsh sliding sound is produced. The same is the case with the lower edge 7b of the flexible flat cable 7 and the flange surface 5a of the rotator 5.

The surface roughness of each of the annular bottom surface 3b and the flange surface 5a is increased in order to suppress the production of the sliding sound as much as possible. However, with the lapse of time, the surface roughness of each of the annular bottom surface and the flange surface becomes lowered, so that a sliding sound is produced. Therefore, although the production cost of molds is increased in order to enhance the surface roughness, sufficient effects can not be obtained.

And besides, the maintenance cost for the molds increased in order to maintain the required surface roughness.

SUMMARY OF THE INVENTION

This invention has been made under the above circumstances, and an object of the invention is to provide a rotary connector in which the production of a sliding sound can be reduced without increasing the surface roughness, thereby achieving a reduced production cost and an enhanced quality at the same time.

To achieve the above object, according to a first aspect of the invention, there is provided a rotary connector comprising:

a cylindrical fixed member defining an inner receiving portion;

a rotary member rotatably concentrically mounted in the inner receiving portion defining an annular space in cooperation with the cylindrical fixed member;

a spirally-wound flexible flat cable received in the annular space, wherein an outer periphery-side end of the flexible flat cable is fixed to the fixed member and a center-side end of the flexible flat cable is fixed to the rotary member; and a contact surface defining the annular space in cooperation with the cylindrical fixed member and the rotary member, wherein a portion of the contact surface adjacent to at least one of the cylindrical fixed member and the rotary member has a slanting surface slanting downwardly so that the flexible flat cable separates from a middle portion of the contact surface.

According to a second aspect of the invention, in the rotary connector of the first aspect, the contact surface comprises a flange surface integrally formed with the rotary member and an annular bottom surface integrally formed with the cylindrical fixed member.

According to a third aspect of the invention, in the rotary connector of the second aspect, the slanting surface is formed on at least one of the flange surface and the annular bottom surface.

In this rotary connector, the annular bottom surface of the inner receiving portion, with which the lower edge of the flat flexible cable, disposed parallel to the plane perpendicular to the center axis of the volute of the spirally-wound flat cable, is held in sliding contact, is formed by the slanting surface slanting downwardly radially inwardly, and the range of sliding contact between the lower edge of the flexible flat cable and the annular bottom surface is reduced. As a result, a sliding sound, produced as a result of sliding movement of the flexible flat cable on the annular bottom surface, is reduced. And besides, it is not necessary to increase the surface roughness of the annular bottom surface in order to reduce the sliding sound, and therefore the production cost of molds is reduced.

In this rotary connector, the flange surface (formed on the outer periphery of the rotary member), with which the lower edge of the flexible flat cable, disposed parallel to the plane perpendicular to the center axis of the volute of the spirally-wound flexible flat cable, is held in sliding contact, is formed by the slanting surface slanting downwardly radially outwardly, and the range of sliding contact between the lower edge of the flexible flat cable and the flange surface is reduced. As a result, a sliding sound, produced as a result of sliding movement of the flexible flat cable on the flange surface, is reduced. And besides, it is not necessary to increase the surface roughness of the flange surface in order to reduce the sliding sound, and therefore the production cost of molds is reduced. In the invention, the annular bottom surface is formed by the slanting surface, and in addition the flange surface is formed by the slanting surface, and in this case the lower edge of the flexible flat cable slides on the two regions, that is, the annular bottom surface and the flange surface, in a line-contact condition, so that the effect of reducing the sliding sound is made maximum.

DETAILED DESCRIPTION OF PREFERRED EMBODIMENT

A preferred embodiment of a rotary connector of the present invention will now be described in detail with reference to the drawings.

Figure 1:
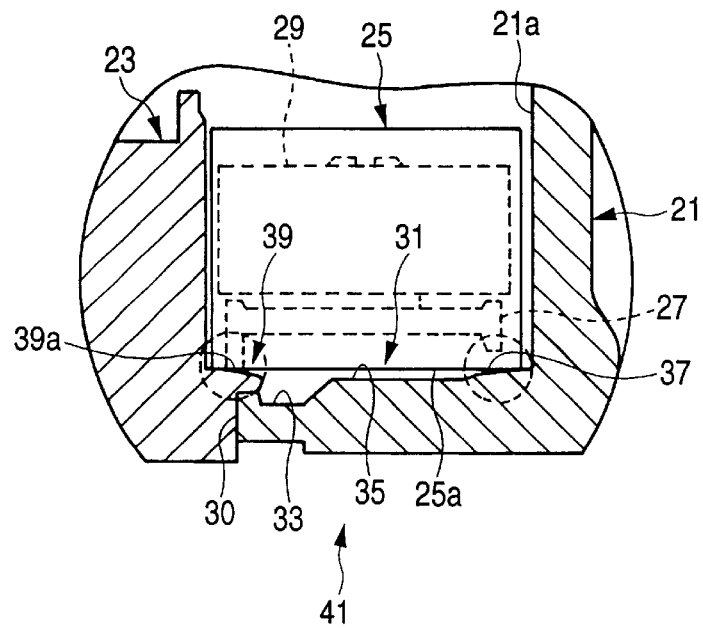
FIG. 1 is a cross-sectional view of an important portion of a rotary connector of the present invention taken in a direction parallel to a center axis of a volute, showing an inner receiving portion thereof.
Figure 2:
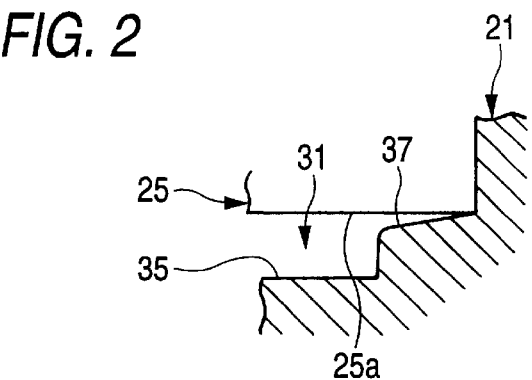
FIG. 2 is an enlarged view of a right encircled portion of FIG. 1 indicated in a broken line.
Figure 3:
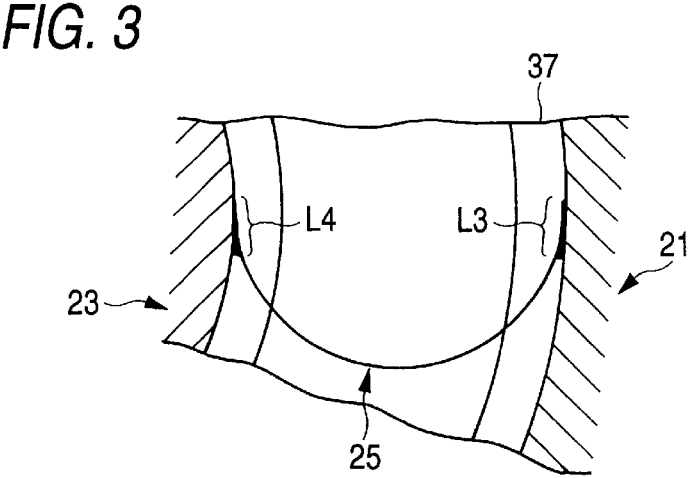
FIG. 3 is a plan view showing a turned portion of a flexible flat cable superimposed on an annular bottom surface of the inner receiving portion and a flange surface of a rotary member shown in FIG. 1.

FIG. 1 is a cross-sectional view of an important portion of the rotary connector of the invention taken in a direction parallel to a center axis of a volute, showing an inner receiving portion thereof, FIG. 2 is an enlarged view of a right encircled portion of FIG. 1 indicated in a broken line, and FIG. 3 is a plan view showing a turned portion of a flexible flat cable superimposed on an annular bottom surface of the inner receiving portion and a flange surface of a rotary member shown in FIG. 1.

The cylindrical rotator (rotary member) 23 is rotatably mounted in the inner receiving portion 21a of a cylindrical undercover (fixed member) 21 in concentric relation thereto. Therefore, the inner receiving portion 21a forms an annular space as a result of mounting the rotator 23 therein. The volute flexible flat cable 25 is received in this annular space formed by the inner receiving portion 21a. A ring-like carrier 27 is mounted in the inner receiving portion 21a in such a manner as to rotate relative to the undercover 21 and the rotator 23. A plurality of roller-like idlers 29 are mounted on the carrier 27 at intervals in the direction of the circumference of the carrier 27, and these idlers 29 are rotatable about their respective rotation axes, extending in the same direction as the center axis of the volute, and are provided in a space between adjacent turns of the flexible flat cable 25. These idlers 29 eliminate slack of the flexible flat cable 25 so as to smoothly effect the winding-up and feeding of this flexible flat cable 25.

Figure 4:
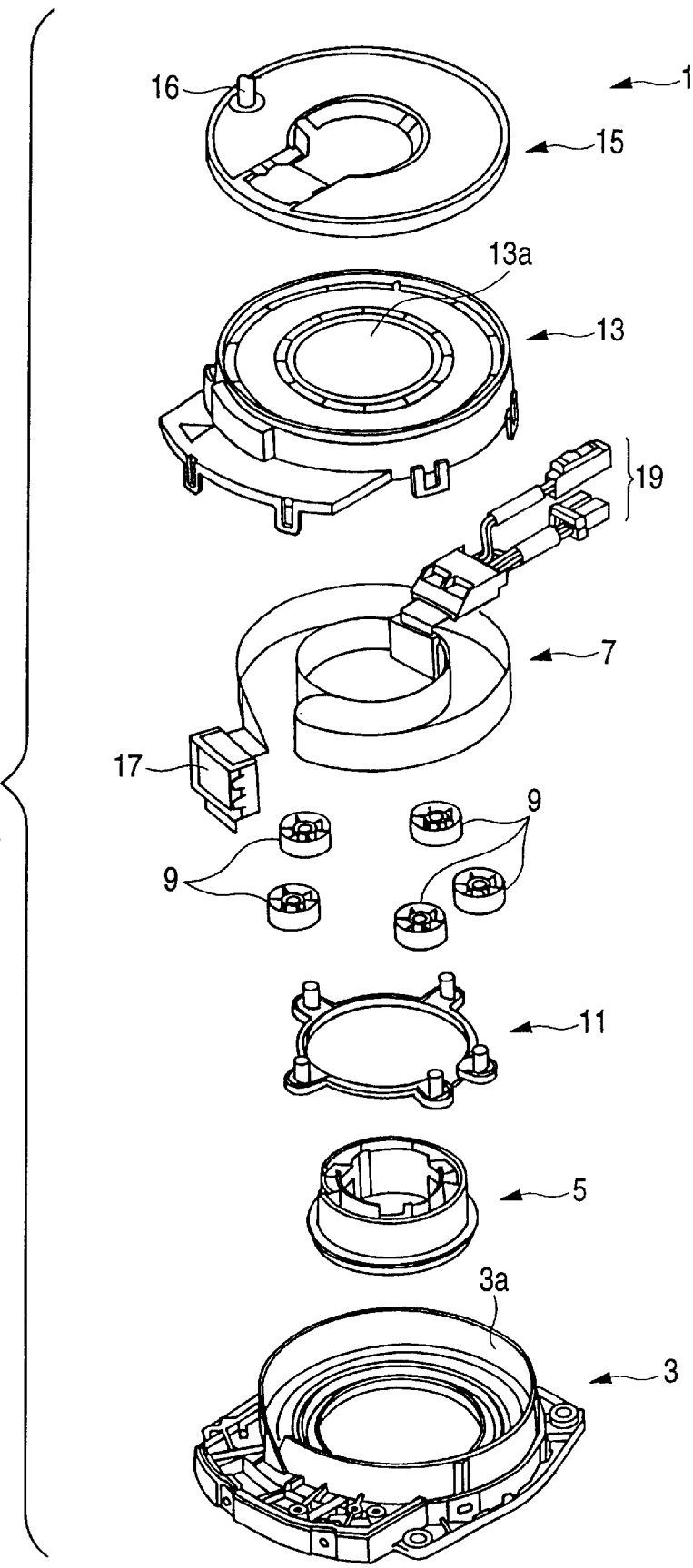
FIG. 4 is an exploded, perspective view of a related rotary connector.
Figure 5:
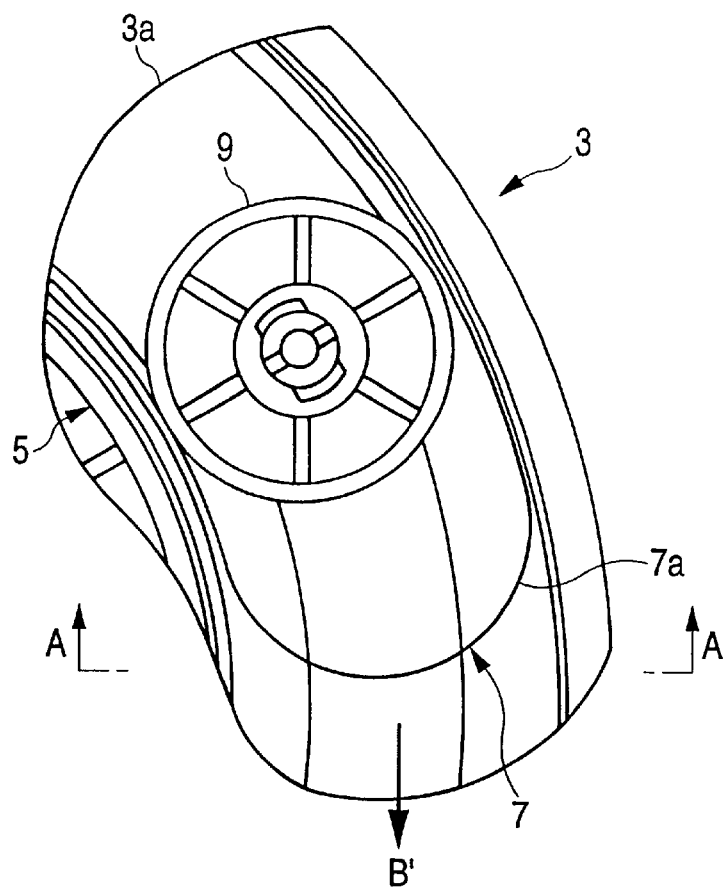
FIG. 5 is a plan view showing an idler of FIG. 4 and its neighboring portion.
Figure 6:
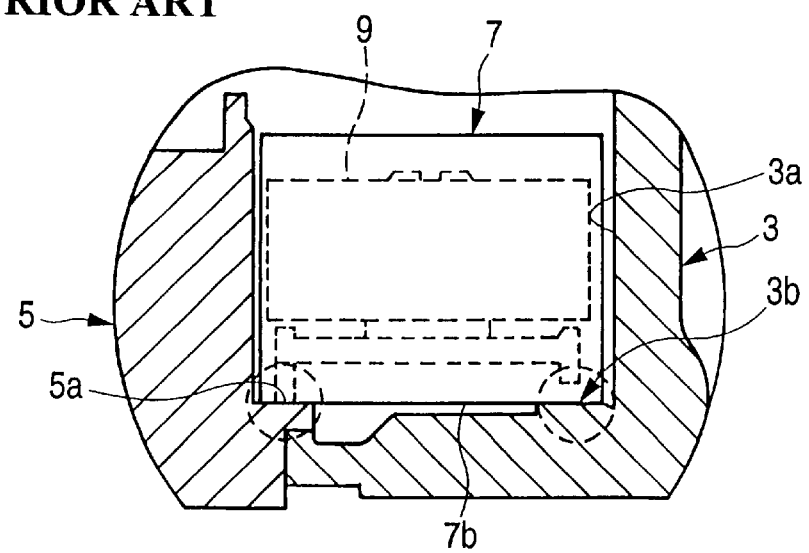
FIG. 6 is a cross-sectional view taken along the line A—A of FIG. 5, showing an inner receiving portion of the related rotary connector.
Figure 7:
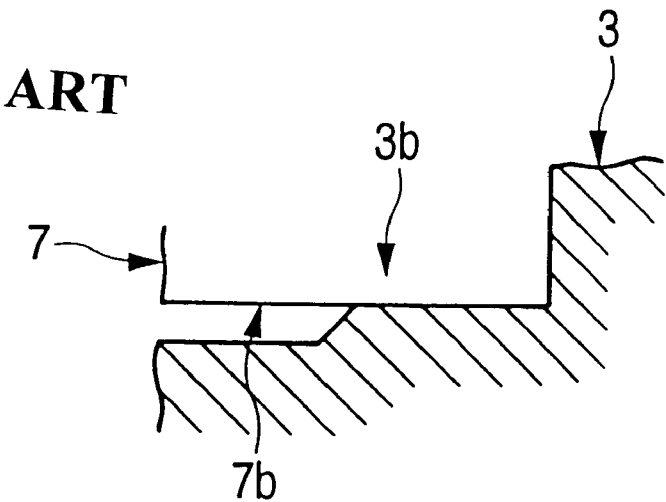
FIG. 7 is an enlarged view of a right encircled portion of FIG. 6 indicated in a broken line.

A cylindrical cover (fixed member) 13, shown in FIG. 4, is fitted on the undercover 21. The cover 13 has a concentric hole 13a, and an upper portion of the rotator 23 projects from the cover 13 through the hole 13a. An annular upper cover (rotary member) 15, shown in FIG. 4, is provided on an upper surface of the cover 13, and this upper cover 15 is fixed to the rotator 23 so as to rotate therewith. A vehicle body-side connector 17, shown in FIG. 4, is mounted at an outer periphery-side end of the flexible flat cable 25, and this vehicle body-side connector 17 is fixed to the undercover 21. Steering-side to connectors 19, shown in FIG. 4, are mounted at a center-side end of the flexible flat cable 25, and the steering-side connectors 19 are passed through the hole 13a in the cover 13, and are fixed to the upper cover 15.

The undercover 21 has a hole 30 formed therein in a concentric manner, and the rotator 23 is rotatably inserted in this hole 30. Therefore, the annular bottom surface 31, forming a bottom surface of the inner receiving portion 21a, is formed at a lower portion of the inner receiving portion 21a of the undercover 21 around a peripheral edge of the hole 30. In FIG. 1 which is a cross-sectional view, this annular bottom surface 31 includes a concave groove portion 33, a flat surface 35 and a sliding contact surface 37 in radially-outward sequence. As shown in FIG. 2, the sliding contact surface 37 is held in sliding contact with a lower edge 25a of the flexible flat cable 25 disposed parallel to a plane perpendicular to the center axis of the volute of the spirally-wound flexible flat cable 25.

This sliding contact surface 37 is defined by a slanting surface slanting downwardly radially inwardly. The lower edge 25a of the flexible flat cable 25 is defined by the edge (one of side edges of the flat cable spaced from each other in the direction of the width thereof) of the substantially spirally-wound flexible flat cable 25. Therefore, the outermost turn of the spirally-wound flexible flat cable 25 slides at its lower edge on the sliding contact surface 37 generally over an entire periphery thereof.

Figure 8:
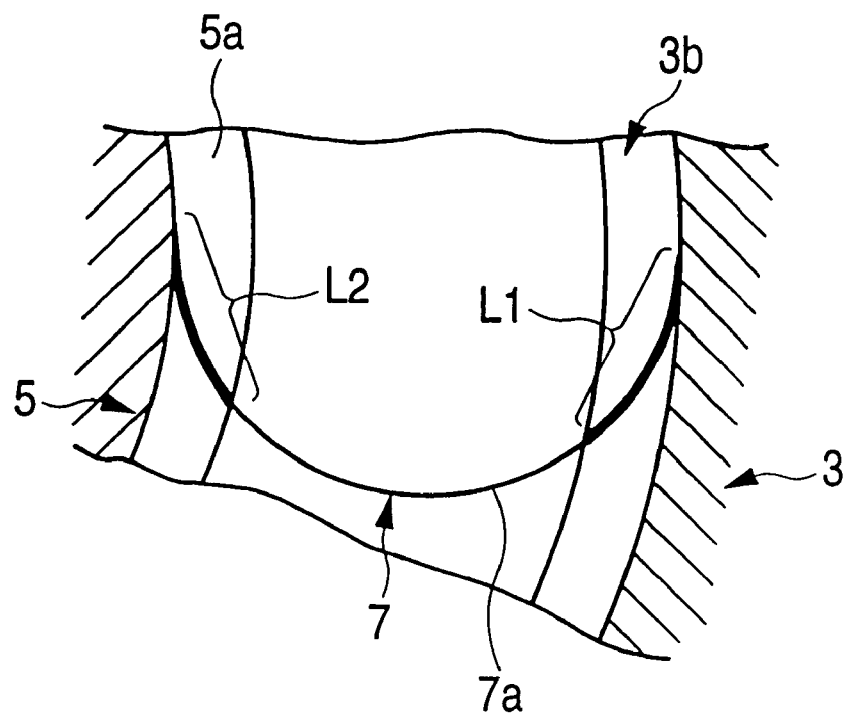
FIG. 8 is a plan view showing a turned portion of a flexible flat cable superimposed on an annular bottom surface of the inner receiving portion and a flange surface of a rotary member shown in FIG. 6.

Therefore, in the related construction, the flexible flat cable slides on the annular bottom surface 3b over the entire range L1 thereof as shown in FIG. 8, whereas in the present invention, only a radially-outward portion L3 of the sliding contact surface 37 is disposed in sliding contact with the lower edge 25a of the flexible flat cable 25, as shown in FIG. 3.

A flange portion 39 is formed on an outer peripheral surface of the rotator 23 over an entire circumference thereof, and this flange portion 39 is abutted against the peripheral edge portion of the hole 30 in order to prevent the rotator 23 from dropping through the hole 30 in the undercover 21. The flange surface 39a, which is an upper surface of this flange portion 39, is defined by a slanting surface slanting downwardly radially outwardly. Therefore, the inner most turn of the spirally-wound flexible flat cable 25 slides at its lower edge on the flange surface 39a generally over an entire periphery thereof.

Therefore, in the related construction, the flexible flat cable slides on the flange surface over the entire range L2 thereof as shown in FIG. 8, whereas in the present invention, only a radially-inward portion L4 of the flange surface 39a is disposed in sliding contact with the lower edge 25a of the flexible flat cable 25, as shown in FIG. 3.

In the rotary connector 41 of the above construction, the undercover 21 is fixed to a steering column, and the rotator 23 is fixed to a steering shaft. With this construction, slack of the flexible flat cable 25 due to the rotation of a handle is absorbed by the winding-up and feeding of the flexible flat cable 25, and this enables auxiliary equipments (the rotary side) (such as a horn switch, a steering switch, control switches of an audio and so on, and an inflator) to be electrically connected to a wire harness (the fixed side) installed on a vehicle body.

Next, the operation of the rotary connector 41 of the above construction will be described.

In the rotary connector 41, the lower edge 25a of the flexible flat cable 25 disposed parallel to a plane perpendicular to the center axis of the volute of the flat circuit cable 25 is held in sliding contact with the annular bottom surface 31 (the sliding contact surface 37). The annular bottom surface 31 (sliding contact surface 37) is formed by the slanting surface slanting downwardly radially inwardly, and the range of sliding contact between the lower edge 25a of the flexible flat cable 25 and the annular bottom surface 31 is reduced (L1>L3). As result, a sliding sound produced due to the sliding movement of the flexible flat cable 25 on the annular bottom surface 31 is reduced. And besides, it is not necessary to increase the surface roughness of the annular bottom surface 31 in order to reduce the sliding sound, and therefore the production cost of molds is reduced.

Further, the lower edge 25a of the flexible flat cable 25 is held in sliding contact with the flange surface 39a of the rotator 23. The flange surface 39a is formed by the slanting surface slanting downwardly radially outwardly, and the range of sliding contact between the lower edge 25a of the flexible flat cable 25 and the flange surface 39a is reduced (L2>L4) As a result, a sliding sound, produced as a result of sliding movement of the flexible flat cable 25 on the flange surface 39a, is reduced. And besides, it is unnecessary to increase the surface roughness of the flange surface 39a in order to reduce the sliding sound, and therefore the production cost of molds is reduced. In the rotary connector 41 of this embodiment, the annular bottom surface 31 of the undercover 21 and the flange surface 39a of the rotator 23 are both formed by the slanting surfaces, respectively, and therefore the lower edge 25a of the flexible flat cable 25 slides on the two regions, that is, the annular bottom surface 31 and the flange surface 39a, in a line-contact condition, so that the effect of reducing the sliding sound is made maximum.

As described above, in the rotary connector of the present invention, the annular bottom surface of the inner receiving portion, with which the lower edge of the flat flexible cable, disposed parallel to the plane perpendicular to the center axis of the volute of the spirally-wound flat cable, is held in sliding contact, is formed by the slanting surface slanting downwardly radially inwardly, and therefore the range of sliding contact between the lower edge of the flexible flat cable and the annular bottom surface is reduced. As a result, a sliding sound, produced as a result of sliding movement of the flexible flat cable, is reduced. And besides, it is not necessary to increase the surface roughness of the annular bottom surface in order to reduce the sliding sound, and therefore the production cost of molds is reduced.

What is claimed is:

1. A rotary connector comprising:

a cylindrical fixed member defining an inner receiving portion;

a rotary member rotatably concentrically mounted in the inner receiving portion defining an annular space in cooperation with the cylindrical fixed member;

a spirally-wound flexible flat cable received in the annular space, wherein an outer periphery-side end of the flexible flat cable is fixed to the fixed member and a center-side end of the flexible flat cable is fixed to the rotary member; and a contact surface defining the annular space in cooperation with the cylindrical fixed member and the rotary member, wherein a portion of the contact surface adjacent to at least one of the cylindrical fixed member and the rotary member has a slanting surface slanting downwardly so that the flexible flat cable separates from a middle portion of the contact surface, wherein the contact surface comprises a flange surface integrally formed with the rotary member and an annular bottom surface integrally formed with the cylindrical fixed member.

2. The rotary connector according to claim 1, wherein the slanting surface is formed on at least one of the flange surface and the annular bottom surface.

* * * * *